United States Patent
Shih

(10) Patent No.: US 8,360,288 B2
(45) Date of Patent: Jan. 29, 2013

(54) DETACHABLE CARRIER SUPPORT MEMBER FOR BICYCLE CARGO RACKS

(75) Inventor: William Shih, Dali (TW)

(73) Assignee: General Cycle Co., Dali, Taichung (TW)

(*) Notice: Subject to any disclaimer, the term of this patent is extended or adjusted under 35 U.S.C. 154(b) by 287 days.

(21) Appl. No.: 12/926,863

(22) Filed: Dec. 14, 2010

(65) Prior Publication Data

US 2012/0145759 A1 Jun. 14, 2012

(51) Int. Cl.
*B62J 9/00* (2006.01)
*B62J 7/04* (2006.01)

(52) U.S. Cl. ....... 224/42.4; 224/426; 224/431; 224/450; 224/452

(58) Field of Classification Search ............... 224/42.32, 224/42.4, 42–431, 445, 448, 450, 452, 558; 248/346.01, 346.03, 550–551
See application file for complete search history.

(56) References Cited

U.S. PATENT DOCUMENTS

| | | | | |
|---|---|---|---|---|
| 3,910,471 A | * | 10/1975 | Niemann | 224/455 |
| 4,053,091 A | * | 10/1977 | Martelet | 224/415 |
| 4,325,531 A | * | 4/1982 | Omholt | 248/553 |
| 5,226,341 A | * | 7/1993 | Shores | 74/551.8 |
| 7,997,602 B2 | * | 8/2011 | Chan et al. | 280/202 |
| 2006/0138185 A1 | * | 6/2006 | Lien et al. | 224/427 |
| 2008/0073396 A1 | * | 3/2008 | Chiang et al. | 224/413 |
| 2008/0203126 A1 | * | 8/2008 | Campbell | 224/413 |

FOREIGN PATENT DOCUMENTS

| | | | |
|---|---|---|---|
| DE | 102006018237 | * | 10/2007 |
| JP | 2005219602 A | * | 8/2005 |
| JP | 2007176444 A | * | 7/2007 |

* cited by examiner

*Primary Examiner* — Justin Larson
*Assistant Examiner* — John Cogill
(74) *Attorney, Agent, or Firm* — Guice Patents PLLC

(57) ABSTRACT

The present invention provides a detachable carrier support member for bicycle cargo racks includes a base plate, a frame rack set, and a plurality of clamping block sets. The base plate is fixedly joined to the bottom of a carrier, wherein the bottom of the base plate is attached to the frame rack set. Further, the base plate is secured on a fixed position by the plurality of clamping block sets that clamps and holds on to the support bar of the bicycle cargo rack. To attach the carrier support member to the bicycle cargo rack, the plurality of clamping block sets is inserted into a wedging groove disposed at two lateral frame racks of the frame rack set; whereby two control shafts brake and allow the user to quickly secure the carrier to and remove the carrier from the cargo rack.

7 Claims, 10 Drawing Sheets

FIG. 4

DETACHABLE CARRIER SUPPORT MEMBER FOR BICYCLE CARGO RACKS

BACKGROUND OF THE INVENTION

1. Field of the Invention

The present invention relates to a detachable carrier support member for bicycle cargo racks which allows users to attach the carrier on to or detach the carrier from the bicycle cargo rack easily according to their needs, thereby increase the efficiency.

2. Description the Prior Art

Referring to FIG. 1, the existing bicycle cargo rack 111 often requires a rope 113 to tie up and secure the carrier 112 (a basket, bag, or box etc.) thereon or to fixedly join the carrier 112 to the bicycle cargo rack 111 by a fixing device.

In view of the foregoing methods, there exist the following disadvantages:

(1) The carrier 112 that is being tied to the bicycle cargo rack 111 by the rope 113 is very likely to fall out of the bicycle cargo rack 111 owing to a loose tie, and therefore damages the objects inside the carrier.

(2) The rope 113 is only required when there's a need of tying, thus if not stored properly, it is likely that the users will be having trouble finding the rope 113 once it is needed.

(3) If to fixedly join the carrier 112 to the bicycle cargo rack 111, once the users want to replace it with a different kind of carrier 112 (say, to replace a basket with a bag) or to remove it from the bicycle cargo rack 111, the detachment of the carrier 112 alone requires a lot of time and therefore is inconvenient.

(4) As the carrier 112 of the bicycle cargo rack 111 is loaded with heavy object, the object may slide and fall out of the carrier when the bicycle passes a turning point and tilts to one side, especially when with the tie is loose.

To solve the foregoing problems, some manufacturers provide a retaining board 122 fixedly joined to the bicycle cargo rack 121, as illustrated in FIG. 2, to increase the supporting surface thereof; some other manufacturers further provide a supporting board 133 fixedly joined to the bottom of the carrier 134, as illustrated in FIG. 3, wherein the supporting board 133 works with the, buckle structure disposed on the retaining board 132 to allow users to conveniently attach or detach the carrier 134.

However, the foregoing methods shown as in FIGS. 2 and 3 still exist the following disadvantages:

(1) Since the bicycle cargo racks on the market are not of the same width, the one-size retaining board 122 or 132 cannot fit the requirement of all different brands or models. As for the manufacturers, to produce different models to fit with all variations available on the market not only requires large storage space but also increases cost burden. Hence, the manufacturers are only capable of producing a few models that are more commonly used to meet the market's need; however, said products still fail to meet all standards of the existing bicycle cargo rack models.

(2) The retaining board is locked to the support bar 123 of the bicycle cargo rack; however, owing to the different support bar 123 diameters of different bicycle brands or models, the connection between the retaining board and the support bar 123 is therefore often insecure.

(3) Once the retaining board is fixedly joined to the bicycle cargo rack, said retaining board takes up all space available for hanging other bags, and thus limits the carrying capacity of the bicycle.

SUMMARY OF THE INVENTION

In order to overcome the deficiencies of the preceding prior art, an object of the present invention is to provide a detachable carrier support member for bicycle cargo racks which allows users to attach the carrier on to or detach the carrier from the bicycle cargo rack easily according to their needs, thereby increase the efficiency.

With the above object in mind, the present invention provides a detachable carrier support member for bicycle cargo racks comprises a base plate, a frame rack set, and a plurality of clamping block sets. The base plate is fixedly joined to the bottom of a carrier, wherein the bottom of the base plate is attached to the frame rack set. Further, the base plate is secured on a fixed position by the plurality of clamping block sets that clamps and holds on to the support bar of the bicycle cargo rack. To attach the carrier support member to the bicycle cargo rack, the plurality of clamping block sets is inserted into a wedging groove disposed at two lateral frame racks of the frame rack set; whereby two control shafts brake and allow the user to quickly secure the carrier to and remove the carrier from the cargo rack.

The frame rack set comprises two control shafts and two lateral frame racks, wherein the outside of the lateral frame racks are disposed of an opening, and the two sides of the lateral frame racks are disposed of a retaining part. Said retaining part provides a wedging groove, wherein the clamping block set is able to insert with the wedging groove. Said retaining part further provides a clamping groove on the inner surface, wherein the two clamping grooves on the said retaining parts of the two lateral frame racks thereby form a space in between to contain and hold the control shaft. The control shaft is further limited by at least one flexible buckle disposed on the interior surface of the lateral frame rack, wherein the flexible buckle is placed in between the two clamping grooves and close to the opening.

The base plate of the present invention is a part of the bottom section of the carrier or an independent plate that is locked to the bottom section of the carrier.

BRIEF DESCRIPTION OF THE INVENTION

The detail structure, the applied principle, the function and the effectiveness of the present invention can be more fully understood with reference to the following description and accompanying drawings, in which:

Figure 4:
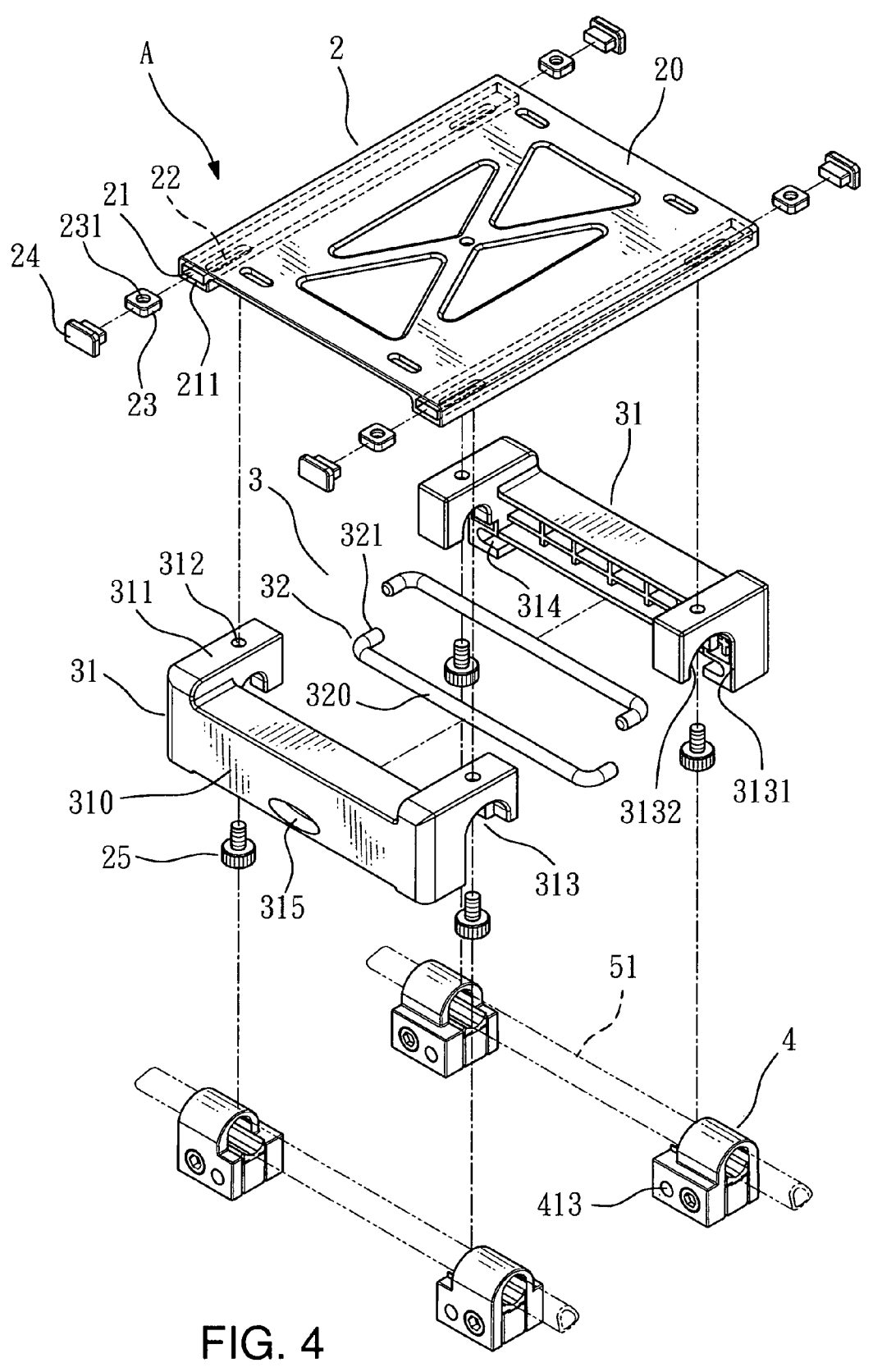

FIG. 4 is an exploded perspective view according to the present invention;

DESCRIPTION OF THE PREFERRED EMBODIMENTS

Figure 1:
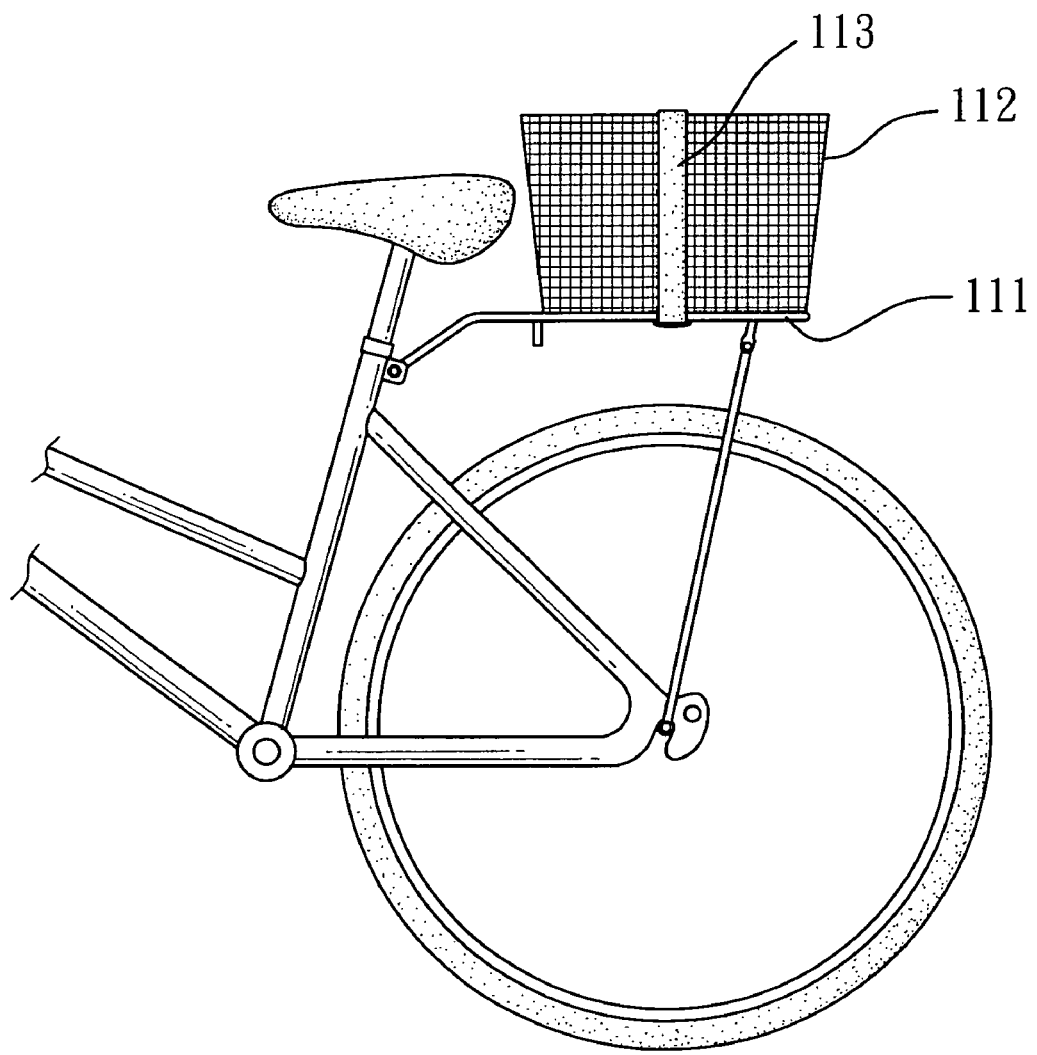
FIG. 1 is a schematic view of a prior art of the bicycle cargo racks.
Figure 2:
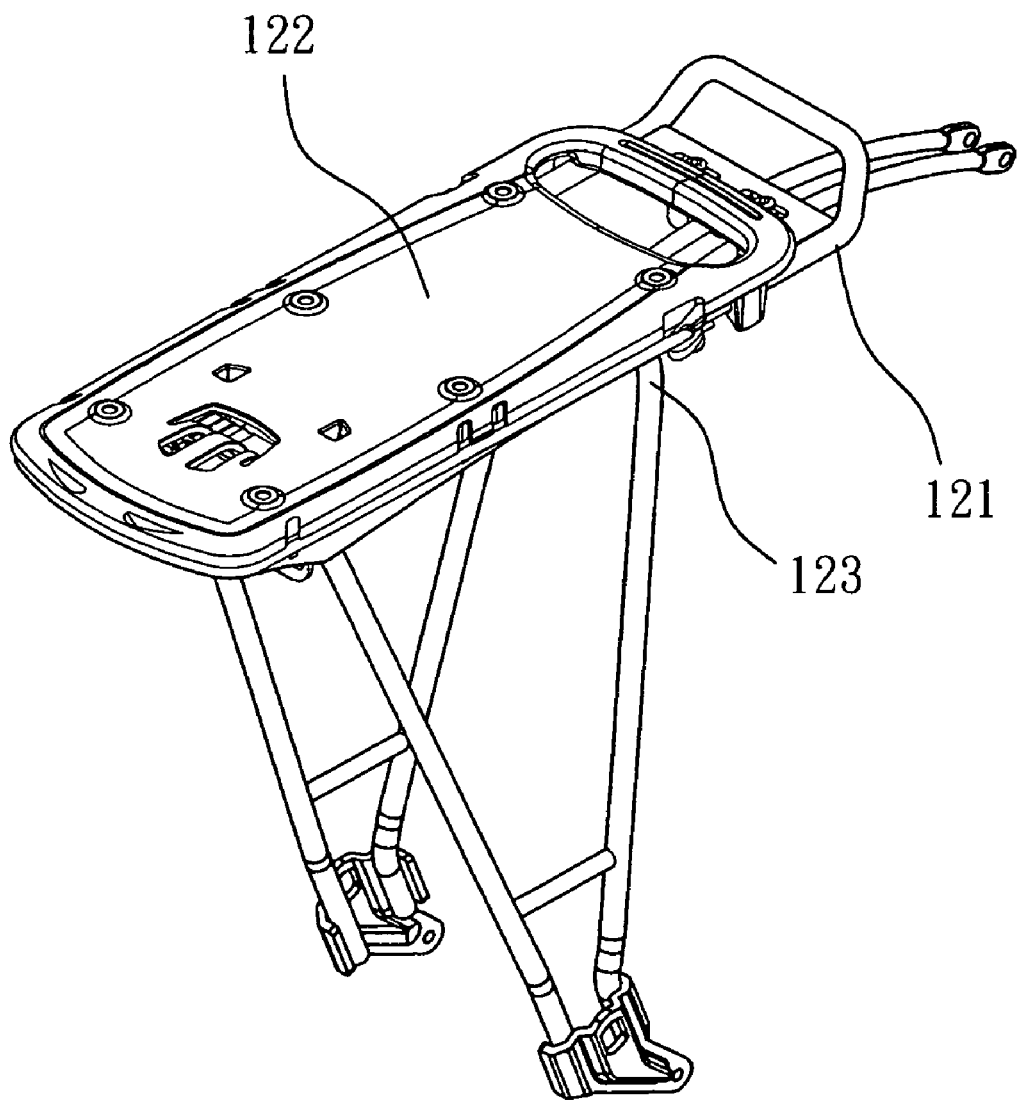
FIG. 2 is a perspective view of a prior art of the bicycle cargo racks.
Figure 3:
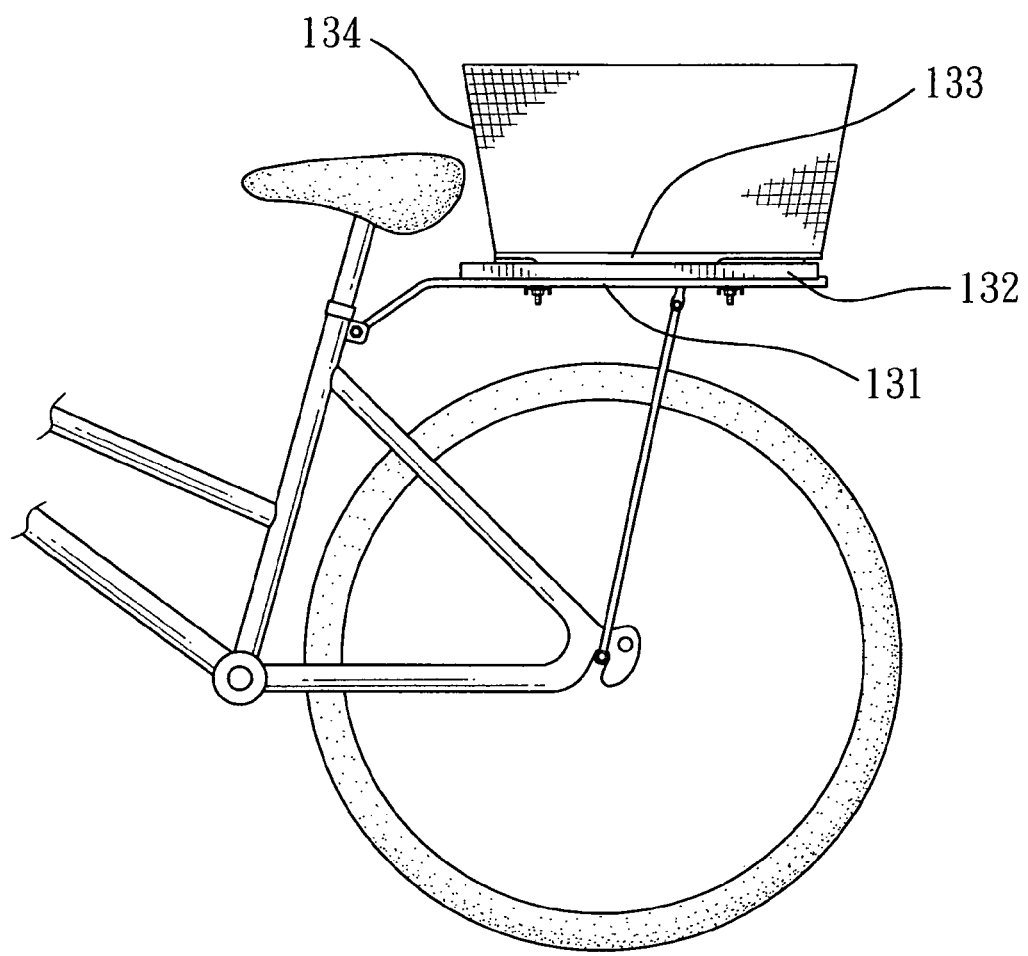
FIG. 3 is a schematic view of another prior art of the bicycle cargo racks.
Figure 5:
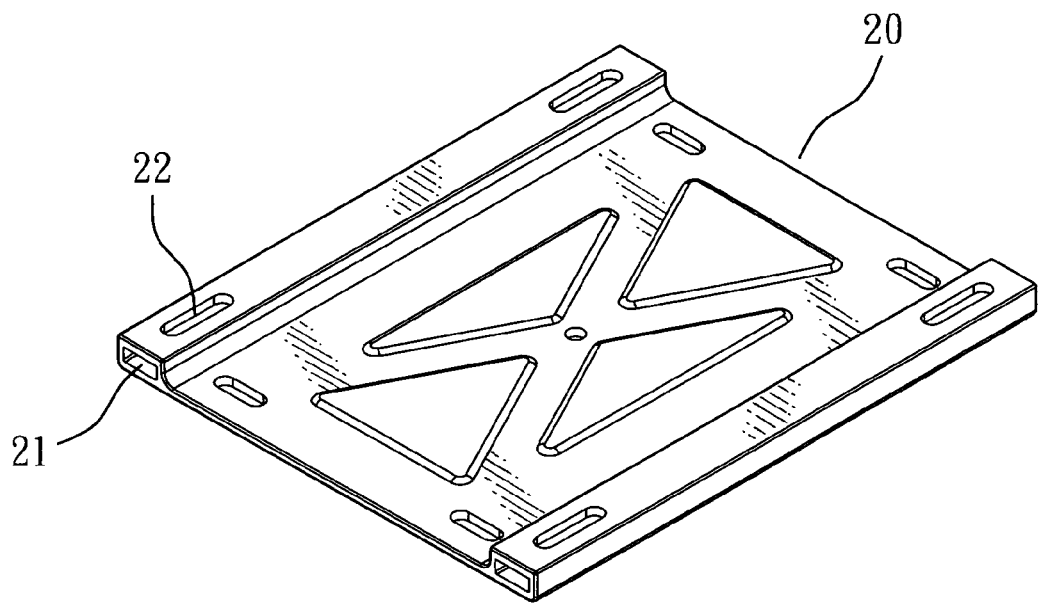
FIG. 5 is a perspective view of the base plate according to the present invention.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

Referring to FIGS. 4-7, the detachable carrier support member for bicycle cargo racks A according to the present invention comprises a base plate 2, a frame rack set 3, and a plurality of clamping block sets 4. The base plate 2 is fixedly joined to the bottom of a carrier 6, wherein the bottom of the base plate 2 is attached to the frame rack set 3. Further, the base plate 2 is secured on a fixed position by the plurality of clamping block sets 4 that clamps and holds on to a support bar 51 of a bicycle cargo rack 5.

The base plate 2 consists of a plate body 20, wherein a sliding groove 21 is disposed at each of the two sides of the plate body 20 respectively. The sliding groove 21 provides at least one slot aperture 22 and contains at least one sliding block 23, wherein the sliding block 23 has a threaded hole 231. A fixing bolt 25 penetrates the slot aperture 22 and screw lock with the threaded hole 231 of the sliding block 23. A plug cap 24 is inserted into each of two ends of the sliding groove 21.

The frame rack set 3 comprises parts described hereinafter.

Two control shafts 32, each comprises a shaft body 320 whereon vertically extends two shaft ends 321; and Two lateral frame racks 31, each provides an opening 315 on its outside surface 310 and a retaining part 311 on each of its two lateral side surfaces. Said retaining part 311 provides a hole 312 on its top surface and a wedging groove 313, wherein the clamping block set 4 is capable of being inserted into the wedging groove 313. Said retaining part 311 further provides a clamping groove 314 on the inner surface, wherein the two clamping grooves 314 on the said two retaining parts 311 of the two lateral frame racks 31 thereby form a space in between to contain and hold the control shaft 32. The position of the control shaft 32 is further limited by at least one flexible buckle 316 disposed on the interior surface 317 of the lateral frame rack 31, wherein the flexible buckle 316 is placed in between the two clamping grooves 314 and close to the opening 315.

The clamping block set 4 fixedly joined to the support bar 51 of the bicycle cargo rack 5 comprises parts described hereinafter.

A clamping base 41 which is a receiving space 411 facing downwards and provides a first bolt bore 412 and a first shaft end retaining aperture 413 at each of two side surfaces 410 thereof.

A locking nut 42 and a locking bolt 43, wherein the locking nut 42 penetrates the first bolt bore 412 to lock with the locking bolt 43.

A fixing component 44 and a flexible pad body 45, both set inside the receiving space 411 of the clamping block set 4; wherein a threaded hole 442 is disposed on the top surface of the fixing component 44 to allow a tightening bolt 443 to be screw locked thereon and further compresses the flexible pad body 45 to attach to the support bar 51. A fixing block 441 of the fixing component 44 is laterally disposed of a second bolt bore 444 and a second shaft end retaining aperture 445, wherein the second bolt bore 444 is corresponding to the first bolt bore 412 to allow the locking nut 42 to penetrate thereof and the second shaft end retaining aperture 445 is corresponding to the first shaft end retaining aperture 413 to allow the shaft end 321 of the control shaft 32 to insert therein.

Figure 7:
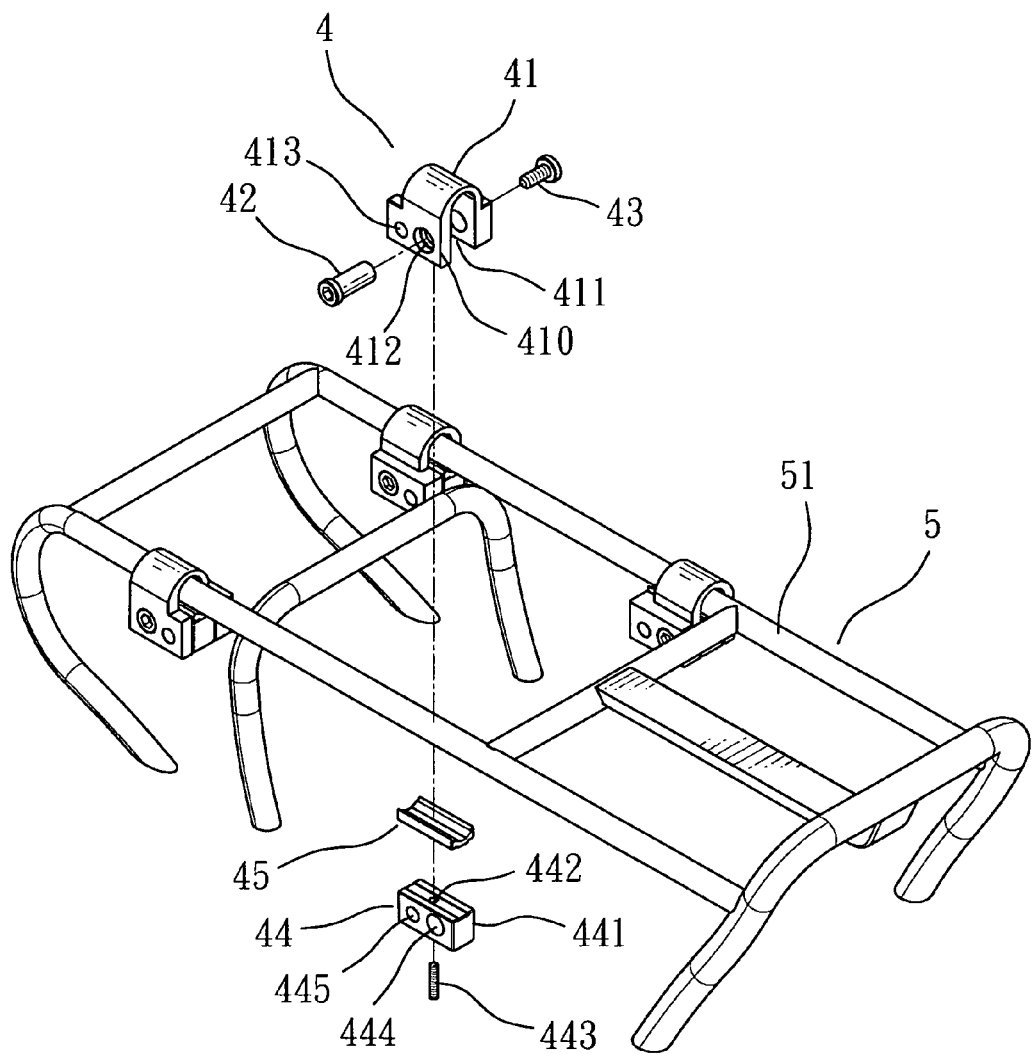
FIG. 7 is an assembled view of the clamping block sets according to the present invention.
Figure 8:
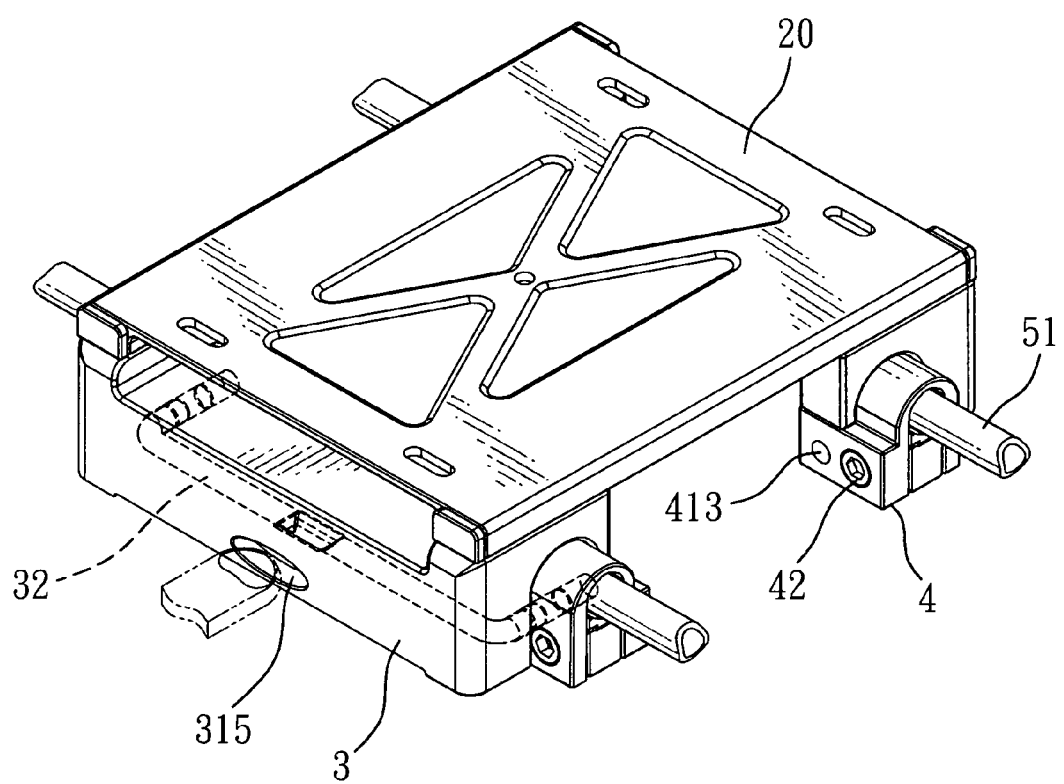
FIG. 8 is an assembled perspective view according to the present invention.
Figure 9:
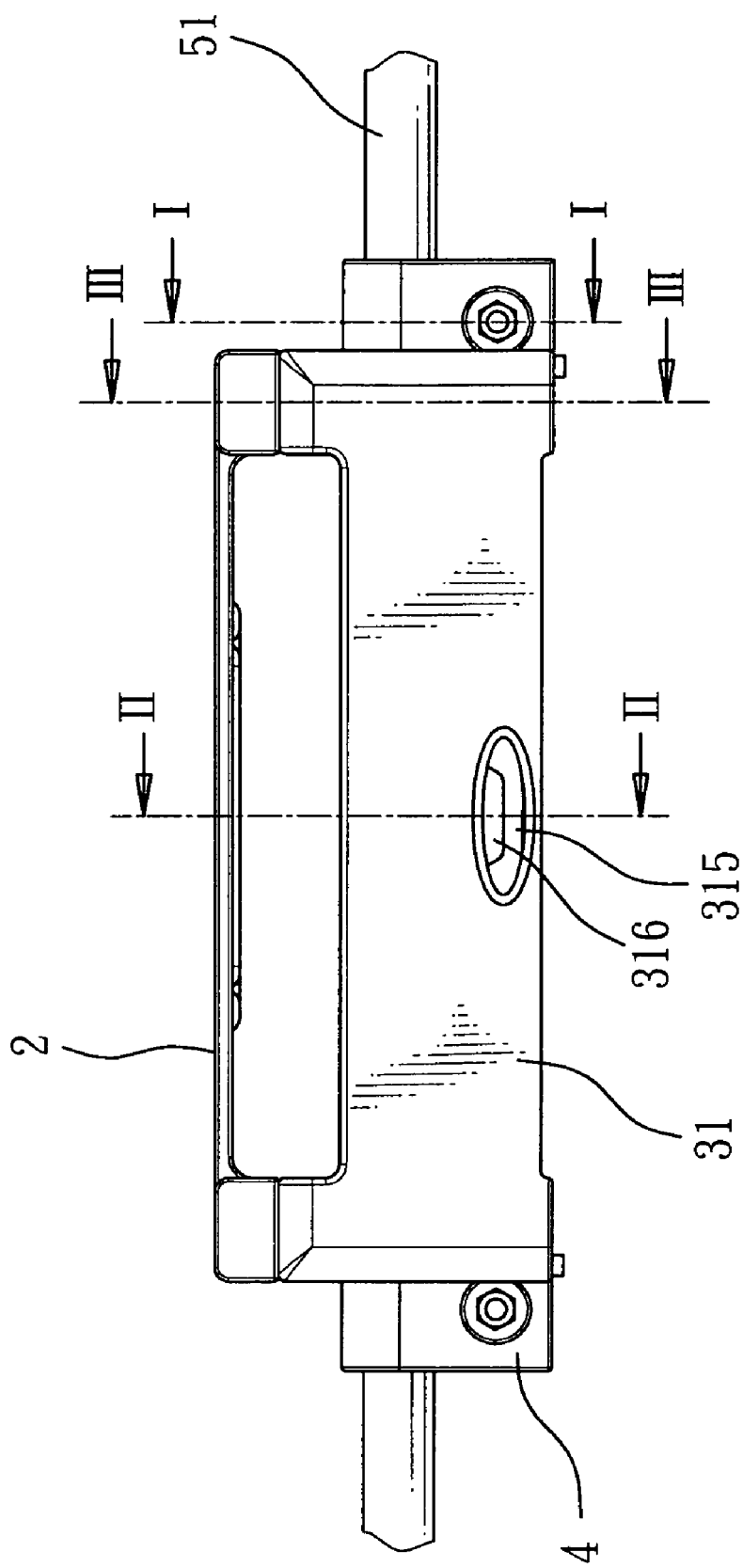
FIG. 9 is an assembled plan view according to the present invention.
Figure 10:
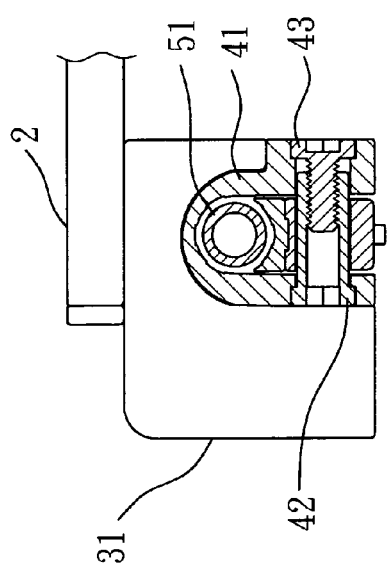
FIG. 10 is a sectional view according to the I-I line of FIG. 9 of the present invention.

Referring to FIGS. 7-9, by assembling the foregoing assemblies, the present invention is able to connect with the bicycle cargo rack 5. Locks the clamping base 41 of the clamping block set 4 to the support bar 51, then place the flexible pad body 45 and the fixing component 44 into the receiving space 411 respectively. And then, penetrates the first and the second bolt bores 412 and 444 with the locking nut 42, wherefrom the locking nut 42 further locks with the locking bolt 43 as illustrated in FIG. 10. The threaded hole 442 is screw locked to the tightening bolt 443 and further compresses the flexible pad body 45 to attach to the support bar 51. For assembling, two of the clamping block sets 4 are to be disposed at each side of the bicycle cargo rack 5, wherein the clamping block set 4 each correspond to the other, and their intervals are to be the same with the intervals between the lateral frame rack 31 and the two wedging grooves 313 of the retaining parts 311, such that the frame rack set 3 is capable of attaching to or detaching from the clamping block set 4 thereof.

The base plate 2 of the present invention is a part of the bottom section of the carrier 6 or an independent plate 2 that is locked to the bottom section of the carrier 6.

Further, to assemble the frame rack set 3, place the two control shafts 32 into the clamping grooves 314 of the two lateral frame racks 31, and penetrates the hole 312 and the slot aperture 22 with the fixing bolt 25, wherefrom the fixing bolt 25 screw locks with the threaded hole 231 of the sliding block 23. The reserved space of the slot aperture 22 allows the present invention to adjust its interval with the cargo rack 5 and the corresponding clamping block sets 4. The installation preparation is thereby completed after fastening the fixing bolt 25 and hence the present invention is applicable to different bicycle models with different cargo racks 5 widths.

Figure 11:
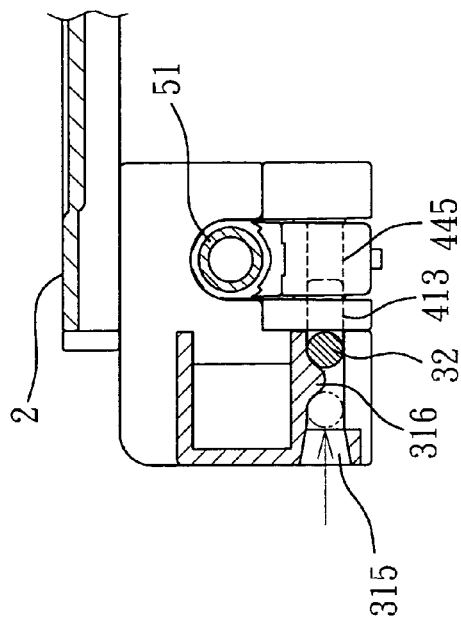
FIG. 11 is a sectional view according to the II-II line of FIG. 9 of the present invention.
Figure 12:
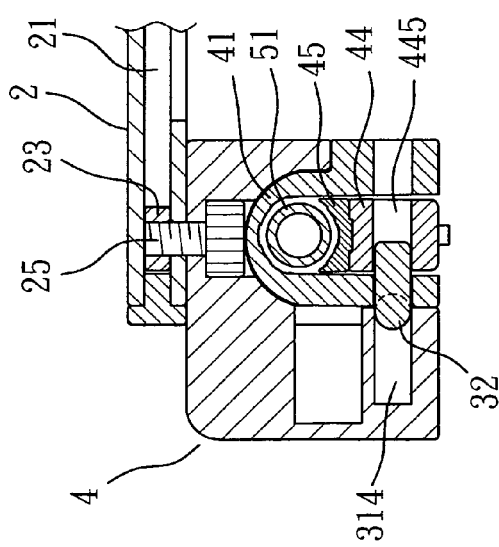
FIG. 12 is a first sectional view according to the III-III line of FIG. 9 of the present invention.
Figure 14:
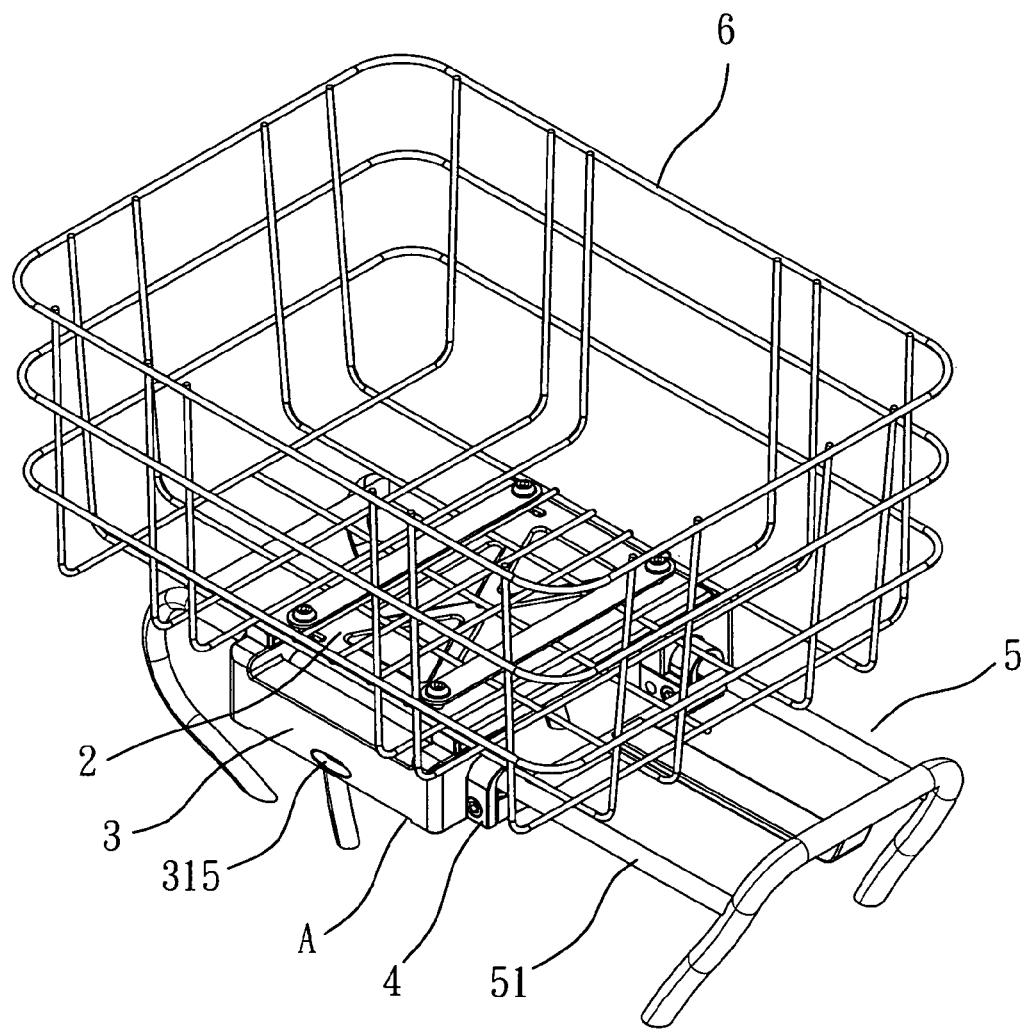
FIG. 14 is a perspective view according to the embodiment of the present invention.

To attach the carrier 6 to the bicycle cargo rack 5, embed the clamping block set 4 into the wedging groove 313 of the lateral frame rack 31 and through the opening 315, insert a finger to push the control shaft 32 inwards until it cross the flexible buckle 316, allowing the shaft end 321 to penetrates the first shaft end retaining aperture 413 and the second shaft end retaining aperture 445 and thus forms a brake thereon and secures the carrier 6 to the cargo rack 5, as illustrated in FIGS. 11 and 12. Referring to FIGS. 8, 9 and 11, the foregoing flexible buckle 316 is made of elastic material and therefore is capable of contracting to allow the control shaft 32 to pass through and recovering to the original place to limit the position of the control shaft 32 after it has passed.

Figure 6:
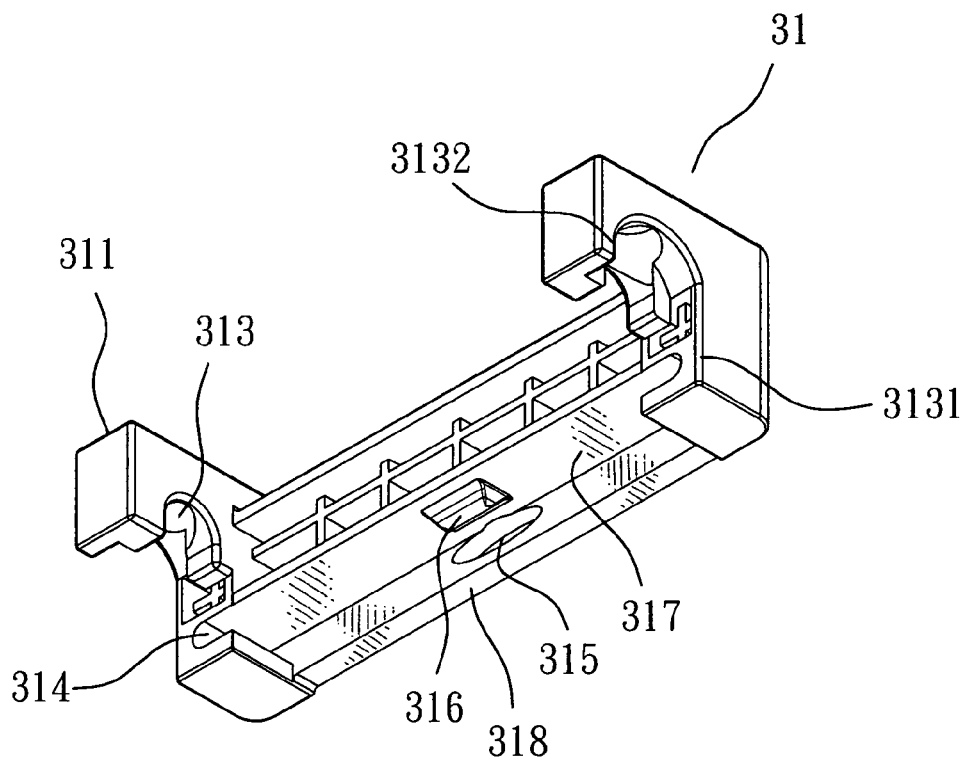
FIG. 6 is a perspective view of the lateral frame rack according to the present invention.
Figure 13:
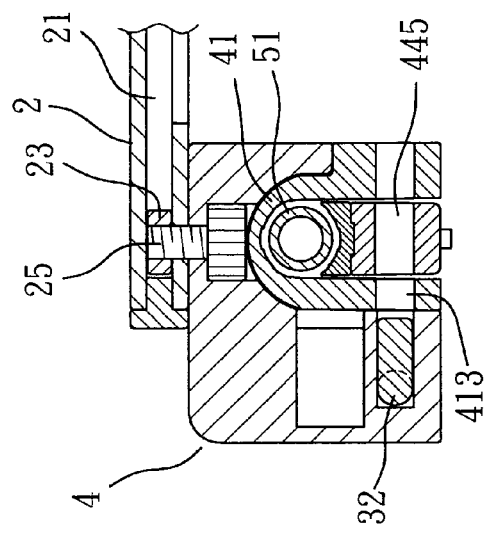
FIG. 13 is a second sectional view according to the III-III line of FIG. 9 of the present invention.

To detach the carrier 6 from the bicycle cargo rack 5, insert a finger into the bottom side 318 of the lateral frame rack 31 to pull the control shaft 32 outwards, freeing the shaft end 321 from the first shaft end retaining aperture 413 and the second shaft end retaining aperture 445 and therefrom disengage the position limitation, as illustrated in FIGS. 6 and 13, and the carrier is hence detachable from the cargo rack 5.

The clamping block set 4 is fixedly joined to the support bar 51 of the bicycle car rack 5, wherein the flexible pad body 45 disposed inside the receiving space 411 of the clamping block set 4, with the help of the locked locking nut 42 and the locking bolt 43, is capable of preventing the clamping block set 4 from sliding forwards and backwards. Wherein, with the tightening bolt 443 vertically compressing the flexible pad body 45, the clamping block set 4 is further prevented from laterally twisting.

The wedging groove 313 of the lateral frame rack 31 is of the design that an outside edge 3131 is vertically disposed and is longer than an inner side edge 3132. The two corresponding lateral frame racks 31 are fixedly joined to the two sides of the bicycle cargo rack 5 respectively, and the two outside edges 3131 are vertically disposed to assist in the connection of the two lateral frame racks 31, therefrom being able to secure the position of the carrier 6 and prevent it from dropping when the bicycle makes turns at road corners.

As the foregoing, the present invention provides a detachable carrier support member for bicycle cargo racks which allows users to attach the carrier on to or detach the carrier from the bicycle cargo rack easily according to their needs, thereby increase the efficiency.

While the invention has been described with reference to a preferred embodiment thereof, it is to be understood that modifications or variations may be easily made without departing from the spirit of this invention, which is defined in the appended claims.

I claim:

1. A detachable carrier support member for bicycle cargo racks, comprising a base plate, a frame rack set and a plurality of clamping block sets, wherein:

the base plate consists of a plate body with a sliding groove disposed at each of the two sides of the plate body respectively, and the sliding groove provides at least one slot aperture at the bottom side surface thereof and contains at least one sliding block with a threaded hole to allow a fixing bolt to penetrate the slot aperture and screw lock with the threaded hole of the sliding block;

the frame rack set attached to the bottom of the base plate comprises:

two control shafts, each comprises a shaft body whereon vertically extends two shaft ends; and two lateral frame racks, each provides a retaining part on each of its two lateral side surfaces, wherein the retaining part provides a hole on the top surface and a wedging groove to allow the clamping block set to insert therein; a clamping groove is further provided by the retaining part on the inner surface, wherein the two clamping grooves on the two retaining parts of the two lateral frame racks thereby form a space in between to contain and hold the control shaft; the position of the control shaft is therefrom limited by at least one flexible buckle disposed at the interior surface of the lateral frame rack; and the clamping block sets are used to secure the base plate to a fixed position by clamping and holding on to a support bar of a bicycle cargo rack, each comprising:

a clamping base being a receiving space facing downwards, providing a first bolt bore and a first shaft end retaining aperture at each of two side surfaces thereof, and a locking nut therefrom penetrates the first bolt bore to lock with a locking bolt;

a flexible pad body set inside the receiving space of the clamping block set;

a fixing component disposed inside the receiving space of the clamping block set, and a second bolt bore and a second shaft end retaining aperture are disposed thereon, the second bolt bore is corresponding to the first bolt bore to allow the locking nut to penetrate thereof and the second shaft end retaining aperture is corresponding to the first shaft end retaining aperture to allow the shaft end of the control shaft to insert therein.

2. The detachable carrier support member for bicycle cargo racks as defined in claim 1, wherein a plug cap is inserted into each of two ends of the sliding groove.

3. The detachable carrier support member for bicycle cargo racks as defined in claim 1, wherein the flexible buckle is placed in between the two clamping grooves.

4. The detachable carrier support member for bicycle cargo racks as defined in claim 1, wherein the base plate is fixedly joined to the bottom of the carrier.

5. The detachable carrier support member for bicycle cargo racks as defined in claim 1, wherein the base plate is a part of the bottom section of the carrier.

6. The detachable carrier support member for bicycle cargo racks as defined in claim 1, wherein the two lateral frame racks each provides an opening on the outside surface.

7. The detachable carrier support member for bicycle cargo racks as defined in claim 1, wherein a threaded hole is disposed on the top surface of the fixing component to allow a tightening bolt to be screw locked thereon and further compresses the flexible pad body to attach to the support bar.

* * * * *